Sept. 29, 1959  J. A. WESTPHAL  2,906,198
NUMBERING DEVICE FOR TIMING LINES ON A SEISMOGRAM
Filed Jan. 16, 1958
FIG.1
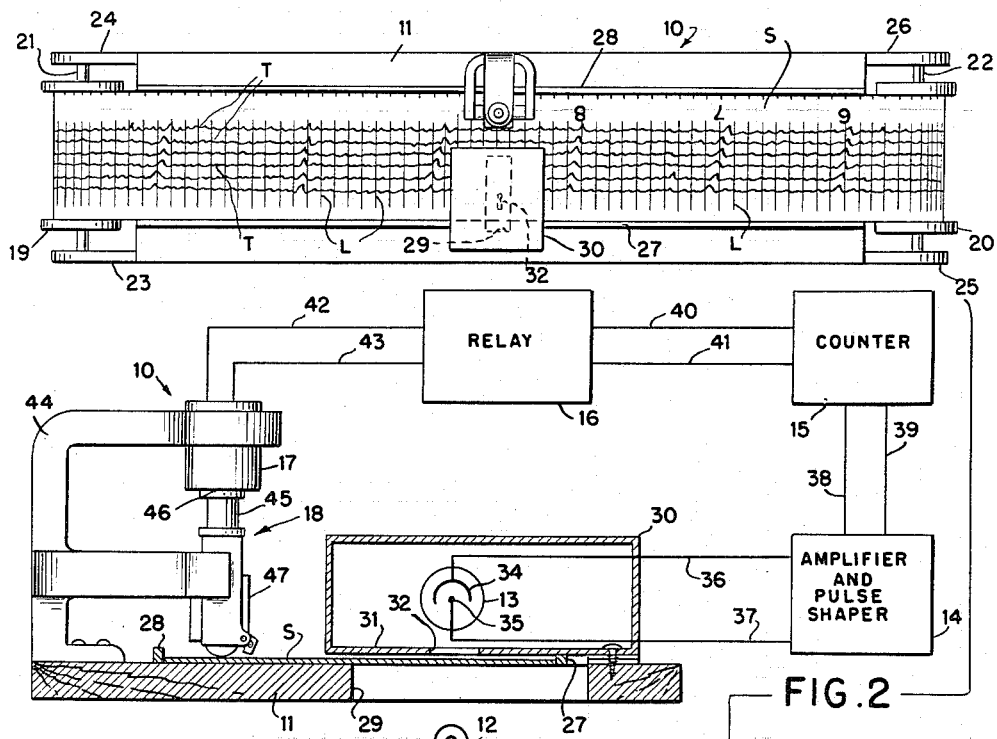
FIG.2
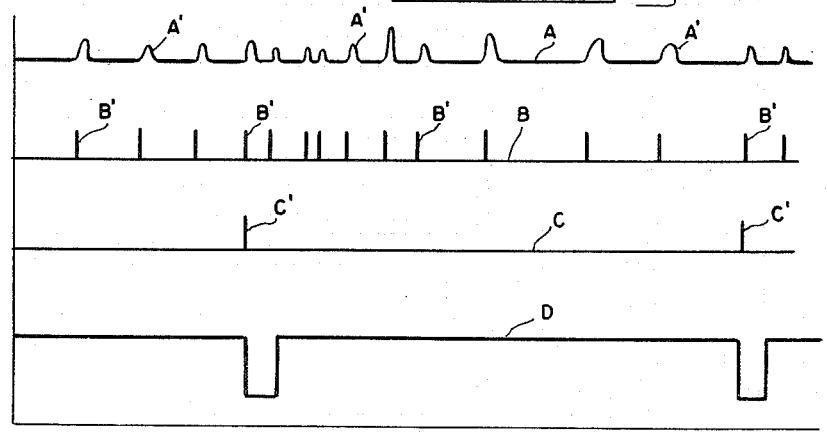
FIG.3
INVENTOR.
James A. Westphal
BY
Adams, Forward and McLean
ATTORNEYS

United States Patent Office 2,906,198
Patented Sept. 29, 1959

2,906,198

NUMBERING DEVICE FOR TIMING LINES ON A SEISMOGRAM

James A. Westphal, Owasso, Okla., assignor to Sinclair Oil & Gas Company, Tulsa, Okla., a corporation of Maine Application January 16, 1958, Serial No. 709,303

2 Claims. (Cl. 101—79)

My invention relates to numbering devices and in particular provides a numbering device for printing a preselected sequence of numbers on a sheet of paper or the like having a series of lines marked at intervals along the length of the paper such that the numbers are placed with each individual number of the sequence positioned adjacent to an individual line of the series.

While it will be apparent that the numbering device of my invention will have a variety of specific applications, its presently contemplated specific usage lies in numbering timing lines on a seismogram or the like and for the sake of clarity and brevity further description of the numbering device of my invention will be described with reference to that particular application.

In seismic prospecting a seismogram, i.e., graphic recording of the simultaneous outputs of a plurality of geophones caused by a single shot, is frequently prepared. The seismogram includes a series of traces marked parallel to each other and extending lengthwise along the surface of a sheet of paper or film and is made by drawing photosensitive paper or film past a bank of mirror galvanometers which are separately energized by different geophone outputs. Since the movement of the paper past the bank of galvanometers as a practical matter cannot be maintained absolutely constant, it is customary also to employ a highly accurate timer which at periodic intervals, usually every hundredth of a second, exposes the paper along a line transverse to the direction of movement of the paper and coinciding with the points at which the various light rays from the bank of mirror galvanometers impinge against the paper. When the photosensitive paper or film is subsequently developed the resultant seismogram, in addition to carrying the parallel lengthwise exposure traces by which the outputs of various geophones are recorded, also carries a series of timing lines transversely marked across such traces. The timing lines are spaced lengthwise of the paper at accurately timed intervals but can be unequally spaced geometrically because of irregular paper movement during exposure.

In interpreting the seismic records thus obtained accurate calculation requires that the time corresponding to each seismic event be known with precision, and accordingly it is customary to count the timing lines from an initial event corresponding to the shot time to the particular seismic event or events from which information is to be obtained. Ordinarily such counting is done by hand numbering every tenth timing line as a matter preparatory to interpreting a seismogram since the unequal spacing of the timing lines which inevitably occurs prevents measurement of time by a ruler or the like.

From the above it will be seen that the specific application contemplated for my invention is to mark the timing lines on a seismogram with numbers preferably numbering every tenth line and preferably in a consecutive sequence.

These and other objects of my invention are essentially obtained by providing a table or other support across which the seismogram can be drawn and on which a reciprocating automatic numbering machine is mounted such that its reciprocating stamp is positioned with its number dies adjacent to the ends of the timing lines on the seismogram as the latter is drawn across the bed. A light source is positioned to cast a beam of light on the seismogram at a fixed position relative to the table adjacent to the automatic numbering machine such that each timing line on the seismogram intercepts the beam at the instant such timing line is adjacent to the numbering machine.

A photosensitive device such as a phototube is positioned to sense the intensity of light at the point where the light beam strikes the seismogram. The output of the photosensitive device is therefore a signal which changes sharply at each instant a timing line intercepts the beam of light. The output signal of the photosensitive device is connected to control reciprocation of the automatic numbering machine stamp, which reciprocation thus prints a number adjacent to the end of the timing line and also changes the number die of the machine which is in operative position to the next consecutive number of the particular sequence of numbers chosen.

Suitably where it is desired to skip lines a counter can be inserted between the photosensitive device and numbering machine such that each pulse in the output of the photosensitive device actuates the counter which in turn is set to control reciprocation of the numbering machine stamp at, for example, every tenth input pulse to the counter. The resultant seismogram which is thereafter removed from the numbering device of my invention is thereby provided with a consecutive series of numbers in which each individual number of the sequence is adjacent to each tenth timing line of the seismogram.

For a more complete understanding of the practical application of the principles of my invention reference is made to the appended drawings in which:

Figure 1 is a plan view of a numbering device according to my invention;

Figure 2 is a cross-section taken at line 2—2 at Figure 1; and

Figure 3 is a graph indicating the relation in time of certain electrical signals involved in the operation of the numbering device shown in Figures 1 and 2.

Referring more particularly to Figures 1 and 2 the numbering device of my invention is generally indicated by the reference numeral 10 and includes basically a table 11, a lamp 12 positioned beneath table 11, a phototube 13 positioned above table 11, a counter 15 connected to the output of phototube 13 through an amplifier and pulse shaping circuit 14 and an automatic numbering machine 18 actuated by a solenoid 17 which is energized by a relay 16 controlled by the output of counter 15.

Table 11 is constructed of an elongated flat board mounted in horizontal position and at its opposite ends carries a pair of spools 19, 20 which are mounted for rotation about a parallel horizontal axis. More particularly spools 19, 20 are respectively mounted on axles 21, 22 which are supported in horizontal position, axle 21 being supported at its ends by trunnions 23, 24 affixed to one end of table 11 and axle 22 being supported by trunnions 25, 26 affixed to the other end of table 11. The positions of axles 21, 22 are set such that the upper surfaces of spools 19, 20 are approximately tangent to the upper surface of table 11 and such that spools 19, 20 are aligned thus permitting a length of sheet material such as a seismogram S drawn from a pay-off reel (not shown) to pass first over spool 19 then across the upper surface of table 11 and finally over spool 20 to a take-up reel (not shown).

On the upper surface of table 11 are affixed a pair of parallel battens 27, 28 with batten 27 extending aligned with one pair of aligned ends of spools 19, 20 and with batten 28 aligned with the other pair of aligned ends of spools 19, 20. Battens 27, 28 thus function as ways for guiding seismogram S across the upper surface of table 11.

Referring more particularly to Figure 1 which shows an intermediate portion of seismogram S extended across the upper surface of table 11 between battens 27, 28, it will be observed that seismogram S in the customary manner is marked lengthwise by a series of parallel traces T which are recordings transversely modulated against a lengthwise time base of the outputs of a number of geophones. It will be further observed that seismogram S is provided with transverse timing lines L which are spaced at fixed time intervals along the length of seismogram S having been made simultaneously with traces T in the conventional manner.

Intermediate of the ends of table 11 it will be observed particularly referring to Figure 2 that an aperture 29 is formed in table 11 and extends partially beneath the path of seismogram S. A closed box 30 is mounted on table 11 directly over aperture 29 and extending partially across the path of seismogram S. The underside plate 31 of box 30 is spaced over a marginal portion of seismogram S and over aperture 29 and is provided with a transverse slit 32 which in a direction lengthwise of table 11 has a maximum dimension only slightly greater than the thickness of a timing line L. Slit 32 is positioned such that as seismogram S is drawn lengthwise between battens 27, 28 the ends of timing lines L which extend beyond traces T pass beneath slit 32.

Lamp 12 is mounted in a fixed position beneath aperture 29 such that when energized by a battery 33 a beam of light from lamp 12 and passing through the translucent paper base of seismogram S is intercepted by slit 32 and allowed to enter otherwise closed box 30. Phototube 13 is thus mounted in box 30 directly over slit 32 such that the beam of light intercepted by slit 32 impinges on the photosensitive cathode 34 of phototube 13 to control the current flowing between cathode 34 and anode 35 of phototube 13 which are externally connected by lines 36, 37 in the input circuit of amplifier and pulse shaper 14. Typically amplifier and pulse shaper 14 includes a differentiating circuit for sharpening pulses in current through phototube 13 and a vacuum tube voltage amplifier for such sharpened pulses. The amplified and sharpened output from pulse shaper and amplifier 14 is connected as an input by lines 38, 39 to counter 15 which by electronic means counts a series of ten pulses and thereupon delivers output voltage pulse in lines 40, 41. The latter couple the output pulse of counter 15 as an input to a vacuum tube relay 16 which is employed to control the delivery of electric power by lines 42, 43 to solenoid 17.

Solenoid 17 is mounted above table 11 on a bracket 44 affixed to table 11 transversely opposite aperture 29. Bracket 44 further supports a reciprocating automatic numbering machine 18 which is physically located above table 11 directly beneath solenoid 17. Numbering machine 18 is of conventional construction and includes a vertically reciprocable shaft 45, the upper end of which carries a vertical armature 46 for solenoid 17 and the lower end of which carries a stamp, i.e., die block 47, in which typically are housed four wheels carrying number dies disposed on a common horizontal axle. Shaft 45 is spring biased upwardly to hold the lowermost number dies above the level of seismogram S. Upon downward reciprocation of shaft 45 stamp 47 is carried downwardly and the lowermost number dies are impressed on the surface of seismogram S adjacent to the opposite end of a timing line L directly located beneath slit 32.

Numbering machine 18 in a conventional manner is provided with an inking pad which normally contacts the set of number dies at the lower end of block 47 and upon downward reciprocation of shaft 45 the pad is removed leaving the inked number dies in operating position to mark the surface which they thereupon strike. In a conventional manner as shaft 45 is raised the die wheels are rotated automatically to increase the numerical quantity represented by the exposed number dies to the next consecutive number. The details of construction of these machines are well known and require no further explanation here.

In operation a typical seismogram is threaded over spool 19 across the upper surface of table 11 between battens 27 and 28 and about spool 20 to the take-up reel, which typically is provided with a motor for taking up seismogram S. Preferably a blank lead strip is employed such that a seismogram S can be threaded into operable position prior to the introduction of timing lines L and traces T beneath box 30. With all the electrical equipment energized and the take-up motor in operation seismogram S is thereupon drawn from left to right, as seen in Figure 1, across the upper surface of table 11.

As timing lines L pass beneath slit 32 the intensity of light passing from lamp 12 to phototube 13 is abruptly diminished coincident with the passing of each timing line L beneath slit 32. The output signal of phototube 13 coupled to amplifier and pulse shaper 14 therefore consists of a fairly steady voltage interrupted periodically by pulses of uneven spacing caused by the irregularity in drive rate during the original exposure of seismogram S and of uneven amplitude caused by irregularities in the thickness of the developed timing lines L. Curve A in Figure 3 is a plot of the output of phototube 13 against time illustrating the irregularity in pulse A' spacing and amplitude. In the output signal of amplifier and pulse shaper 14 the pulses are not only sharpened by the differentiating circuit but are more even in amplitude as a result of clipping in the amplifier. The output delivered to lines 38, 39 is schematically represented in Figure 3 by curve B in which time, the abscissa, corresponds with the time against which curve A is plotted. The resultant output of counter 15 thereupon delivered to relay 16 by lines 40, 41 is represented in Figure 3 by curve C, again plotted against the common time base of curves A and B. In curve C it will be noticed that only one voltage pulse C' occurs for every ten pulses B' in curve B. This latter voltage pulse triggers vacuum tube relay 16 to energize solenoid 17, thus driving armature 46, shaft 45 and stamp 47 downwardly to print a number adjacent to the end of the timing line L which initiated each tenth pulse delivered to counter 15.

Curve D in Figure 3 represents the physical position of the assembly of armature 46, shaft 45 and stamp 47 plotted against the same time base as curves A, B and C. As a result adjacent the end of every tenth timing line L a numeral is stamped which consecutively increases at each additional tenth timing line L. Thus in Figure 1 which represents an intermediate point in the operation of numbering device 10 it can be seen that the numerals 6, 7 and 8 have been consecutively stamped adjacent to consecutive tenth timing lines.

I claim:

1. A numbering device for marking a sequence of numbers on sheet material having a series of lines marked transversely at intervals along the length thereof such that each individual number is positioned in sequence adjacent an individual line of said series, which device includes means defining a supporting surface for said sheet, means for drawing said sheet lengthwise across said surface, a light source positioned to direct a beam of light on said sheet at a fixed position relative to said support means thereby to intercept said lines as said sheet is drawn across said surface, a box positioned adjacent said surface at said fixed position spaced from said surface to permit said sheet material to be passed therebetween, means defining a slit in said box adjacent said surface and extending transversely of the direction in which said sheet is drawn across said surface whereby said lines will pass adjacent said slit, photosensitive means positioned in said box to sense the intensity of light entering said slit and having an output signal responsive to said intensity, a reciprocating automatic numbering machine mounted above said surface adjacent to said fixed position and having a reciprocable number die carrying stamp block operable upon reciprocation thereof to print the next successive number of a pre-selected sequence on said sheet adjacent to said fixed position, and means coupled to said output signal and connected to reciprocate said stamp block upon a change in said output signal corresponding to a decrease in intensity of light at said fixed position.

2. A numbering device for marking a sequence of numbers on sheet material having a series of lines marked transversely at intervals along the length thereof such that each individual number is positioned in sequence adjacent an individual line of said series, which device includes a table having an aperture defined therein, means for drawing said sheet lengthwise across said table over said aperture, a light source positioned under said aperture to direct a beam of light on said sheet through said aperture thereby to intercept said lines as said sheet is drawn across said table, a box positioned adjacent the surface of said table at the position of said aperture spaced from said surface to permit said sheet material to be passed therebetween, means defining a slit in said box adjacent said surface and extending transversely of the direction in which said sheet is drawn across said table whereby said lines will pass adjacent said slit, photosensitive means positioned in said box to sense the intensity of light passing through said sheet and said slit and having an output signal responsive to said intensity, a reciprocating automatic numbering machine mounted above said table adjacent to said aperture and having a reciprocable number die carrying stamp block operable upon reciprocation thereof to print the next successive number of a pre-selected sequence on said sheet adjacent to said aperture, and means coupled to said output signal and connected to reciprocate said stamp block upon a change in said output signal corresponding to a decrease in intensity of light passing through said sheet at the position of said aperture.

References Cited in the file of this patent

UNITED STATES PATENTS

| | | |
|---|---|---|
| 2,084,044 | Muller | June 15, 1937 |
| 2,246,906 | Viebahn | June 24, 1941 |
| 2,264,873 | Cockrell | Dec. 2, 1941 |
| 2,312,626 | Chamberlin | Mar. 2, 1943 |
| 2,323,843 | Richter | July 6, 1943 |
| 2,364,345 | Cooper | Dec. 5, 1944 |
| 2,470,926 | Gieseke | May 24, 1949 |
| 2,518,325 | Hurley | Aug. 8, 1950 |
| 2,600,817 | Victoreen | June 17, 1952 |
| 2,682,212 | Knobel | June 29, 1954 |

FOREIGN PATENTS

| | | |
|---|---|---|
| 698,414 | Germany | Nov. 8, 1940 |